US008415022B2

(12) United States Patent
Haenen et al.

(10) Patent No.: US 8,415,022 B2
(45) Date of Patent: Apr. 9, 2013

(54) COATING FORMULATION FOR AN OFFSET PAPER AND PAPER COATED THEREWITH

(75) Inventors: Jean-Pierre Haenen, Eijsden (NL); Ronald Van De Laar, Zutendaal (NL)

(73) Assignee: SAPPI Netherlands Services B.V., Maastricht (NL)

( * ) Notice: Subject to any disclaimer, the term of this patent is extended or adjusted under 35 U.S.C. 154(b) by 0 days.

(21) Appl. No.: 12/738,221

(22) PCT Filed: Oct. 10, 2008

(86) PCT No.: PCT/EP2008/008563
§ 371 (c)(1), (2), (4) Date: Apr. 15, 2010

(87) PCT Pub. No.: WO2009/052960
PCT Pub. Date: Apr. 30, 2009

(65) Prior Publication Data

US 2010/0239761 A1 Sep. 23, 2010

(30) Foreign Application Priority Data

Oct. 26, 2007 (EP) .................................... 07119350

(51) Int. Cl.
*B32B 23/04* (2006.01)

(52) U.S. Cl. ...................... 428/532; 428/537.5; 428/323

(58) Field of Classification Search .................. 428/532, 428/537.5, 323
See application file for complete search history.

(56) References Cited

U.S. PATENT DOCUMENTS

| | | | | |
|---|---|---|---|---|
| 6,666,953 | B1 * | 12/2003 | Gane et al. | 162/181.2 |
| 7,871,681 | B2 * | 1/2011 | Scholte et al. | 428/32.3 |
| 8,101,250 | B2 * | 1/2012 | Haenen et al. | 428/32.21 |
| 2004/0020410 | A1 * | 2/2004 | Gane et al. | 106/464 |
| 2006/0162884 | A1 | 7/2006 | Gane et al. | |

FOREIGN PATENT DOCUMENTS

| | | | |
|---|---|---|---|
| EP | 0 445 952 | A1 | 9/1991 |
| WO | 2007/006794 | A1 | 1/2007 |
| WO | 2007/006796 | A1 | 1/2007 |

* cited by examiner

*Primary Examiner* — Leszek Kiliman
(74) *Attorney, Agent, or Firm* — Sughrue Mion, PLLC

(57) ABSTRACT

The document describes a coated paper for offset printing e.g. with a TAPPI 75° gloss value of below 35% or with high gloss properties, comprising at least on one side a top coating layer, said top coating layer comprising a pigment part, the 100 parts in dry weight thereof comprising in the range of 5-40 parts in dry weight of a fine particulate ground calcium carbonate with surface and internal structure modification as a result of treatment with one or more medium to strong $H_3O+$ providers and eventually additional treatment with gaseous carbon dioxide, a binder part of 2-20 parts in dry weight of binder and (regular) additives in the range of 0-8 parts in dry weight.

26 Claims, 1 Drawing Sheet

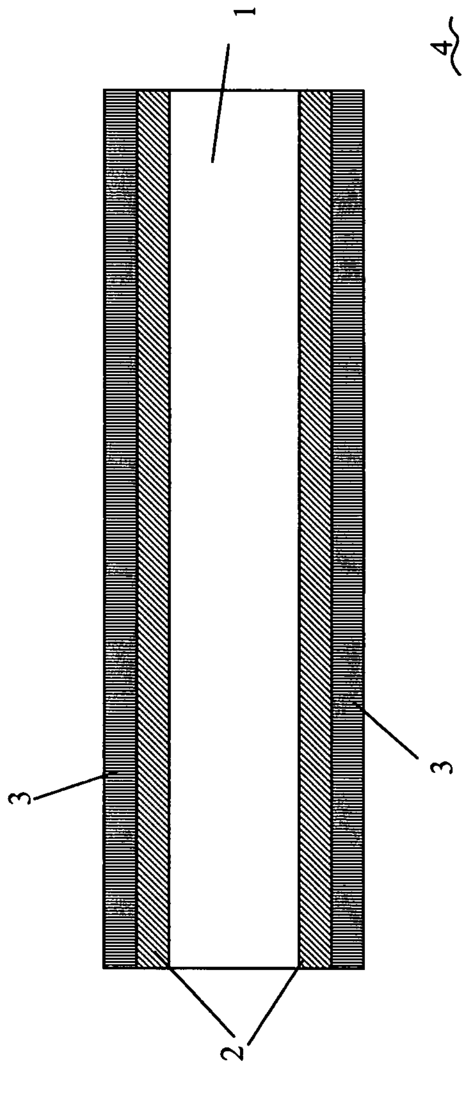
1
4
3
3
2

COATING FORMULATION FOR AN OFFSET PAPER AND PAPER COATED THEREWITH

TECHNICAL FIELD

Matt, silk/medium gloss or glossy/high gloss coated paper for offset printing comprising at least on one side a top coating layer to be printed.

BACKGROUND OF THE INVENTION

In the field of sheet-fed offset printing it is desirable to be able to further reprint and process freshly printed sheet as quickly as possible, while at the same time still allowing the printing inks to settle in and on the surface of the paper in a way such that the desired print gloss and the desired resolution can be achieved. Relevant in this context are on the one hand the physical ink drying process, which is connected with the actual absorption of the ink vehicles into an image receptive coating, e.g. by means of a gradual system of fine to coarse pores or a special system of very fine pores. On the other hand there is the so-called chemical drying of the ink, which is connected with solidification of the ink in the surface and on the surface of the ink receptive layer, which normally takes place due to an oxidative cross-linking (oxygen involved) of cross-linkable constituents of the inks. This chemical drying process can on the one hand also be assisted by IR-irradiation, it may however also be sped up by adding specific chemicals to the inks which catalytically support the cross-linking process. The more efficient the physical drying during the first moments after the application of the ink, the quicker and more efficient the latter chemical drying takes place.

Nowadays typically times until reprinting and converting are in the range of several hours (typical values until reprinting for standard print layout: about 1-2 h; typical values until converting for standard print layout: 12-14 h; matt papers are more critical than glossy papers in these respects), which is a severe disadvantage of the present ink and/or paper technology, since it slows down the complete printing processes and necessitates intermediate storage. Today shorter times are possible if for example electron beam curing or UV irradiation is used after the printing step, but for both applications special inks and special equipment is required involving high costs and additional difficulties in the printing process and afterwards.

An improvement in this respect is described in WO-A-2007/006794 as well as WO-A-2007/006796. In a preferred embodiment of these two disclosures, the highly advantageous quick ink setting properties and chemical drying properties for offset printing are achieved by using a specific amorphous silica pigment, namely silica gel with a high (nano) fine internal porosity.

SUMMARY OF THE INVENTION

The object of the present invention is therefore to provide an improved coating and/or coated paper for offset printing comprising at least on one side a top coating layer, which can be matt, medium gloss or high gloss.

This object is achieved by providing a coated paper for offset printing with, in case of a matt grade, a TAPPI 75° (Tappi 480, 75°, DIN EN ISO 8254-T1+2-03 (75°)) gloss value of below 35%, in case of a medium gloss grade, a TAPPI 75° gloss value of in the range 35-70% and in case of a glossy grade, a TAPPI 75° gloss value of at least 70%, said coated paper comprising at least on one side a top coating layer, said top coating layer comprising

- a pigment part, the 100 parts in dry weight thereof comprising in the range of only 5-40 parts in dry weight of a fine particulate ground calcium carbonate with nano-sized surface and internal (pore) structure modification as a result of treatment with one or more medium to strong $H_3O^+$ ion providers and eventually with gaseous carbon dioxide, wherein nano-sized surface and internal pore structure preferably means comprising internal and/or surface pores with average pore sizes in the range of 5-100 nm, preferably in the range of 30-70 nm, most preferably with a narrow pore size distribution;
- a binder part of 2-20 parts in dry weight, preferably of 5-12 parts in dry weight of binder; and
- and (regular) additives in the range of 0-8 parts in dry weight.

Preferably, in case of a matte coated paper it has a TAPPI 75° gloss value of below 35%, preferably below 25%, In case of a high gloss coated paper it preferably has a Tappi 75° gloss value of at least 75%, more preferably of at least 80% or even 85%.

Specifically it was found that using the proposed fine particulate ground calcium carbonate with (nano-sized) surface and internal (pore) structure modification, as e.g. disclosed in U.S. Pat. No. 6,666,953 but without necessarily an involved treatment with gaseous carbon dioxide, and as for example available from Omya, CH under the trade name Hydrocarb V70, preferably of the type Hydrocarb V70 R240 ME, on the one hand provides for fast to very fast ink setting properties even if not being the sole constituent of the pigment part. It would indeed unexpectedly found that it is sufficient to have at most 40 parts in dry weight of the pigment part of this pigment. It was specifically found that it is possible to reach overall very fast ink setting properties similar to the ones which can be achieved if silica gel is present in the pigment part, so the proposed specific pigment can be used to at least partially replace if not fully supplement or replace silica gel or generally amorphous silica pigments in the coating while however maintaining similar if not equivalent overall very fast ink setting properties. This is a major achievement as a silica gel is not only difficult to handle in the coating process (e.g. problem of low solids of silica gel aqueous pigment slurries and prepared coatings and problem of dust formation) and leads to a number of side-effects of the prepared coatings which have to be corrected for e.g. by additional constituents of the coating formulation, but in addition to that the replacement provides a very attractive cost advantage as silica gel pigments usually are relatively expensive.

According to a first embodiment of the invention, the fine particulate ground calcium carbonate with surface and internal structure modification and eventually an additional treatment with gaseous carbon dioxide is comprised in the pigment part in the range of 10-30 parts in dry weight, preferably 20-30 parts in dry weight. For example 25% of the pigment part could be shown to be sufficient to show almost ideal fast offset printing properties.

Another preferred embodiment is characterised in that the fine particulate ground calcium carbonate with surface and internal structure modification and eventually an additional treatment with gaseous carbon dioxide has a median particle size in the range of approximately 1.5-2.5 μm. It is also advantageous if the fine particulate ground calcium carbonate with surface and internal structure modification and eventually an additional treatment with gaseous carbon dioxide has an average internal pore size in the range of 0.01-0.1 μm, preferably in the range of 0.03-0.08 μm, most preferably around 0.05 μm. Indeed this specific range of around 0.05 μm, to provide high driving force for fast absorption rate and supplemented by a parallel system of interconnected intra-particulate pores or voids in the total pigment matrix with average pores or voids diameter of approximately 0.1-1 μm for effective overall ink vehicles transport seems to be well matched to typical offset printing inks leading to very advantageous printing properties. Specifically, a pore system including the above Hydrocarb V70 and a corresponding matrix, eventually provided by a PCC pigment as detailed below, appears to be well matched, and 50 nm driving force pores seem to be similarly powerful as in case of silicagel with typical size range of 10-30 nm pores. Without being bound to any theory, it seems that the parallel traffic system of relatively larges pores in case of pigments of the type of Hydrocarb V70 plus (or combined with) a matrix, eventually based on such PCC, is even somewhat more effective.

Further the fine particulate ground calcium carbonate with surface and internal structure modification and eventually an additional treatment with gaseous carbon dioxide preferably has a surface area in the range of 30-80 $m^2/g$, preferably in the range of 50-70 $m^2/g$. Furthermore the fine particulate ground calcium carbonate with surface and internal structure modification and eventually an additional treatment with gaseous carbon dioxide can advantageously have a particle size distribution such that 73-83% of the particles is smaller than 2 μm, and that 35-44% of the particles is smaller than 1 μm.

A very good porosity ideal for fast ink setting properties of the final matt, medium gloss or high gloss offset paper can be achieved if the fine particulate ground calcium carbonate with surface and internal structure modification and eventually an additional treatment with gaseous carbon dioxide is preferably of the so-called roses type. This means that the individual particles of this pigment with a clustered nano-sized platelet structure and with internal nano-sized pores are of generally round and almost spherical shape, and they look similar to if not identical to the ones as disclosed in annex 4 of US 2006/0162884. Also other Hydrocarb V70 forms are possible, e.g. the so-called eggs, golfballs, brains and Beluga/Kaviar types as disclosed e.g. in the publications

*Achieving Rapid Absorption and Extensive Liquid Uptake Capacity in Porous Structures by Decoupling Capillarity and Permeability: Nanoporous Modified Calcium Carbonate, in Transport in Porous Media* vol. 63, nr. 2, pp. 239-259, May 2006; or

*Achieving Rapid Absorption and Extensive Liquid Uptake Capacity in Porous Structures by Decoupling Capillarity and Permeability: Nanoporous Modified Calcium Carbonate, in Colloids and Surfaces A: Physicochemical and Engineering Aspects*, Vol. 236, Issues 1-3, pp. 91-102, Apr. 1, 2004.

A further preferred embodiment of the proposed coating is characterised in that the pigment part comprises less than 15 parts, preferably less than 10 parts, at most preferably less than or equal to 5 parts in dry weight of an amorphous silica gel or precipitated silica. As mentioned above, it is one of the unexpected findings of the present invention, that the highly beneficial advantages of the coating formulations which have for example been disclosed in WO 2007/006794 and WO 2007/006796 can, for matte, medium gloss as well as high gloss papers, be reached by at least partial, if not full replacement of the silica by the proposed fine particulate ground calcium carbonate with surface and internal structure modification and eventually an additional treatment with gaseous carbon dioxide, wherein however typically the amount of silica to be replaced has to be compensated by preferably about in the range of twice to three or four times the amount of the former proposed special treated fine particulate ground calcium carbonate. So for example to replace 5 of the 10 parts of silica gel in a coating, it proves advantageous to introduce 10-20 parts of the proposed special treated fine particulate ground calcium carbonate pigment, and to fully replace these 10 parts silica gel for example 25 parts of the proposed special treated fine particulate ground calcium carbonate pigment can be introduced, of course with a corresponding reduction of the other pigments within the pigment part.

A further preferred embodiment of the invention is characterised in that the pigment part comprises a further fine particulate carbonate and/or kaoline and/or talcum and/or gypsum and/or satin white and/or alumina tri-hydroxide (ATH) and/or titanium dioxide and/or barium sulphate and/or plastic pigment and/or another mineral or synthetic pigment generally known for such applications, or a mixture thereof. Preferably, the talcum pigment makes up 0-15 parts in dry weight, preferably 3-10 parts in dry weight of the pigment part. Further preferably the further fine particulate carbonate is a regular ground calcium carbonate and/or precipitated calcium carbonate without surface and internal structure modification and of any known specific crystal modification like calcite (e.g. scalenohedric, rhombohedric, prisms, platelets) and/or like aragonite (e.g. separate or bundled needles) and/or like vaterite (e.g. spherulites or spheres) but preferably needle-like and/or a mixture of such pigments: preferred is the aragonite type.

Complete or essentially complete replacement of silica gel pigments within the coating formulation is for example possible, if the pigment part comprises a further fine particulate, preferably precipitated calcium carbonate (PCC, but also kaoline or a plastic pigment or and/or talcum and/or gypsum and/or satin white and/or alumina tri-hydroxide (ATH) and/or titanium dioxide and/or barium sulphate and/or plastic pigment and/or another mineral or synthetic pigment known for such applications, or a mixture thereof is possible if having similar particle size distribution and preferably also inter-particulate porosity properties) pigment in a proportion of 30-70 parts in dry weight, preferably 40-60 parts in dry weight. Preferably this further fine particulate has a particle size distribution such that 85-95% of the particles are smaller than 1 micrometer, that 65-75% of the particles are smaller than 0.5 micrometer, and that 25-35% of the particles are smaller than 0.2 micrometer. So preferably the further fine particulate precipitated calcium carbonate pigment has a particularly steep particle size distribution and provides the ideal framework or matrix with a beneficial parallel system of interconnected intra-particulate pores or voids with average diameter of approximately 0.1-1 micrometer (to facilitate effective overall ink vehicles transport) for the fine particulate ground calcium carbonate with surface and internal structure modification and eventual additional treatment with gaseous carbon dioxide for optimum fast ink setting properties of the final coating and the optimum surface gloss properties. To this end, preferably the further fine particulate pigment has a median particle size ($d_{50}$) in the range of 0.2-0.5 micrometer, and is preferably a precipitated calcium carbonate pigment with steep particle size distribution and preferably needle-like particle morphology.

A further preferred embodiment is characterised in that the further fine particulate pigment essentially has no internal pores within the pigment particles, so it is essentially non-porous. It however efficiently builds up a system of intra-particulate pores/voids with a pore size in the range of its particle size, so preferably at around 0, 1-1 micrometer and/or wherein the further fine particulate pigment has a surface area (BET) in the range of 8-20 $m^2/g$, preferably in the range of approximately 10-15 $m^2/g$.

According to a preferred embodiment, the paper is characterised in that the pigment part comprises one or a mixture of further fine particulate precipitated calcium carbonate pigment in a proportion of 10-40 parts in dry weight, preferably 15-30 parts in dry weight, wherein this further fine particulate precipitated calcium carbonate pigment has a particle size distribution such that 70-95% of the particles are smaller than 1.6 micrometer, that 60-80% of the particles are smaller than 1.0 micrometer, and that 10-25% of the particles are smaller than 0.4 micrometer, wherein preferably this further fine particulate pigment has a surface area in the range of 20-80 $m^2/g$, more preferably in the range of 30-50 $m^2/g$. The pigment part of such a paper preferably specifically essentially consists of 10-30 parts in dry weight, preferably 15-25 parts in dry weight of the fine particulate ground calcium carbonate with surface and internal structure modification and eventually with additional treatment of gaseous carbon dioxide, 10-30, preferably 15-25 parts in dry weight of the one or the mixture of the fine particulate precipitated calcium carbonate, 30-50, preferably 40-50 parts in dry weight of one or a mixture of further fine particulate ground calcium carbonate pigment, preferably with a particle size distribution such that at least 90% of the particles are smaller than 2 micrometer, as well as 0-15, preferably 3-12 parts in dry weight of a talcum pigment, preferably of a talcum which is surface treated and/or impregnated with aminosilane coupling agents.

Still further improvement can be brought about if the coated paper is characterised in that its pigment part consists of 20-30 parts in dry weight of the fine particulate ground calcium carbonate with surface and internal structure modification and eventual additional treatment with gaseous carbon dioxide, 40-60 parts in dry weight of the fine particulate precipitated calcium carbonate with preferably needle-like morphology, 10-30 part in dry weight of a further different fine particulate e.g. ground calcium carbonate pigment, preferably with a particle size distribution such that at least 90% of the particles are smaller than 2 micrometer, as well as 0-15, preferably 3-10 parts in dry weight of a talcum pigment.

In particular in respect of reduced ink scuff properties of the final coating, it is advantageous if the talcum used is surface treated and/or impregnated with an organic silane component as e.g. given in the product Mistrobond C or R10C of Talc de Luzenac (FR). The organosilane and/or organosilanol component for the coating/impregnation/surface treatment is preferably an amino-alkyl based organosilane and/or organosilanol.

Particularly good very fast ink setting results can be achieved, if not only the top coating but also a middle coating immediately adjacent to the top coating and beneath said top coating comprises the proposed fine particulate ground calcium carbonate with surface and internal structure modification and eventual additional treatment with gaseous carbon dioxide. So in accordance with a further embodiment of the invention, beneath said top coating layer there is a middle coating layer, wherein this middle coating layer comprises a pigment part, the 100 parts in dry weight thereof comprising in the range of 5-40 parts in dry weight of a fine particulate ground calcium carbonate with surface and internal structure modification and eventual additional treatment with gaseous carbon dioxide as defined in any of the preceding claims, a binder part and optionally (regular) additives. Preferably, the remainder of the pigment part of the middle coating layer comprises or preferably consists of at least one further and different fine particulate pigment selected from the group of: calcium carbonate, kaoline, talcum, gypsum, satin white, alumina tri-hydroxide (ATH), titanium dioxide, barium sulphate, plastic pigment, or another mineral or synthetic pigment known for such applications, or a mixture thereof, wherein preferably the further and different fine particulate pigment is a calcium carbonate pigment with a particle size distribution such that at least 60% of the particles, preferably at least 85 or 90% of the particles are smaller than 2 micrometers or a mixture of two or several types thereof. The middle coating is typically applied in a grammage in the range of 8-13 $g/m^2$, preferably 10-12 $g/m^2$ and the top coating in a grammage in the range of 8-13 $g/m^2$, preferably 10-12 $g/m^2$.

Preferably the paper can be printed in an offset printing process without the use or with reduced amount of offset powder and/or without irradiative drying after printing and/or without use or with reduced amount of overprint varnish. It further shows appealing printed image, good folding properties, as well as low ink scuff.

The above more specific coating formulation proposals are preferably tailored and adapted for matt coated papers with a gloss as defined above. If a shifting of the gloss to higher values, i.e. to satin or high-gloss values, is desired, the above proposals can be adapted by adding in the general pigment part (so in the pigment part supplementing the specifically proposed fine particulate ground calcium carbonate with surface and internal structure modification and eventual additional treatment with gaseous carbon dioxide) pigments which are known in the field to impart or enhance gloss.

One possibility to this end is to include a relatively higher proportion of a hollow or solid plastic pigment or a mixture of such pigments, typically in the range of 5-50, preferably 5-20 parts in dry weight. The solid or hollow particulate polymer pigment can be selected from the group consisting of: poly (methyl methacrylate), poly(2-chloroethyl methacrylate), poly(isopropyl methacrylate), poly(phenyl methacrylate), polyacrylonitrile, polymethacrylonitrile, polycarbonates, polyetheretherketones, polyimides, acetals, polyphenylene sulfides, phenolic resins, melamine resins, urea resins, epoxy resins, polystyrene latexes, polyacrylamides, and alloys, blends, mixtures and derivatives thereof. The particulate polymer pigment can be modified polystyrene latex. It can also be based on styrene maleic acid copolymeric latexes (SMA) and/or styrene malimide copolymeric latexes (SMI), preferably based almost exclusively on styrene malimide copolymeric latexes (SMI) with glass transition temperatures in the range of approximately 200° C. Possible is the use of such a polymer pigment with a particle size distribution such that more than 90% of the particles are smaller than 0.5 micrometer, preferably with a particle size distribution such that 90% of the particles have sizes between 0.05 and 0.3 micrometer, in particular between 0.1 and 0.2 micrometer, or in the case of a vacuolated polymer pigment also with a median particle size of about 0.6 micrometer.

In the alternative or in addition to that it is possible to enhance the gloss by increasing the relative proportion of PCC (preferably with the properties as defined above) in the coating formulation up to values of 80 parts in dry weight, preferably to be present in 20-70 parts in dry weight.

It is also (in addition to the above possibilities or as an alternative thereof) possible to increase the gloss by including generally a relatively higher proportion of fine pigments (median particle size well below 0.5 micrometer) like fine ground calcium carbonates like e.g. HC95 or Setacarb HG as available for example from OMYA and as detailed below in the experimental section. These fine pigments can be present in a proportion as described above for PCC.

Preferably for high gloss grades the pigment part is essentially free from coarse pigments, meaning free from pigments typically with a median particle size above 1 micrometer.

For matt papers typically the final paper is not or only little calendered. For medium gloss the final paper is preferably calendered, and for high-gloss the paper is preferably strongly calendered using several nips with a nip line pressure in the range of 50-200 N/mm, most preferably at an elevated calendering temperature above 50° C.

As already outlined above, the present printing sheet is tailored for offset printing. Correspondingly, in contrast to inkjet papers, it is specifically tailored for taking up typical inks as used in sheet-fed or roll offset printing, and not for printing inks as used in inkjet printing, which show much less attractive acceptance at present printing sheet. Commercially available offset printing inks are generally being characterised by their total surface energy in the range of about 20-28 mN/m (average about 24 mN/m) and dispersive part of total surface energy in the range of 9-20 mN/m (average about 14 mN/m). Surface energy values measured at 0.1 seconds, on a Fibrodat 1100, Fibro Systems, Sweden. Commercially available inkjet printing inks on the other hand are being characterised by their (higher) total surface energy in the range of about 28-31 mN/m (average about 31 mN/m) and dispersive part of total surface energy in the range of 28-31 mN/m (average about 30 mN/m), thus with very low polar part of total energy (average about 1 mN/m). According to another preferred embodiment therefore, the total surface energy of the image receptive coating layer is thus matching the surface energy characteristics of the offset ink, so the surface energy is e.g. less than or equal to 30 mN/m, preferably less than or equal to 28 mN/m. This in contrast to typical inkjet papers, which have total surface energy values of at least 40 mN/m and up to about 60 mN/m. It is further preferred that the dispersive part of the total surface energy of the image receptive coating layer is less than or equal to 18 mN/m, preferably less than or equal to 15 mN/m. Again, this is in complete contrast to values of inkjet papers, as for these the dispersive part generally is well above 20 mN/m and even up to 60 mN/m.

As already mentioned above, the coating formulation comprises a binder part. The binder part makes up e.g. 7-12 parts in dry weight compared to the 100 parts of the pigment part. Higher binder contents of up to 30 parts can be useful e.g. if silica gel or precipitated silica are used as the silica part in high amounts. The binder may generally be chosen to be a single binder type or a mixture of different or similar binders. Such binders can for example be selected from the group consisting of latex, in particular styrene-butadiene, styrene-butadiene-acrylonitrile, styrene-acrylic, in particular styrene-n-butyl acrylic copolymers, styrene-butadiene-acrylic latexes, acrylate vinylacetate copolymers, starch, polyacrylate salt, polyvinyl alcohol, soy, casein, carboxymethyl cellulose, hydroxymethyl cellulose and copolymers as well as mixtures thereof, preferably provided as an anionic colloidal dispersion in the production. Particularly preferred are for example latexes based on acrylic ester copolymer which are based on butylacrylate, styrene and if need be acrylonitrile. Binders of the type Acronal or Basonal as available from BASF (Germany) or other type Litex as available from PolymerLatex (Germany) are possible.

In addition to the binder, additives can be and typically are present in the coating formulation, e.g. selected from defoamers, colorants, brighteners, dispersants, thickeners, water retention agents, preservatives, crosslinkers, lubricants and pH control agents etc. or mixtures thereof as known to the person skilled in the art.

An image receptive coating may be provided on both sides of the substrate, and it may be applied with a coat weight in the range of 5 to 15 g/m$^2$ on each side or on one side only. The full coated paper may have a weight in the range of 80-400 g/m$^2$. Preferably the substrate is a woodfree paper substrate.

As already discussed further above, the time to converting and reprinting should be reduced significantly. According to another preferred embodiment therefore the printing sheet is characterised in that it is re-printable within less than 30 minutes, preferably within less than 15 minutes and convertible within less than one hour, preferably within less than 0.5 hours. In this context, re-printable is intending to mean that a printed sheet can be fed for a second time through the printing process to be printed on the opposite side without detrimental side effects like for example blocking, marking, smearing etc. In this context, convertible means to be able to undergo converting steps as well-known in the paper industry (converting includes turning, shuffling, folding, creasing, cutting, punching, binding and packaging etc of printed sheets).

The present invention furthermore relates to a method for making a printing sheet as discussed above. The method is characterised in that a coating formulation comprising a fine particulate ground calcium carbonate with nano-sized surface and internal (pore) structure modification as a result of treatment with one or more medium to strong $H_3O^+$ ion providers and eventually with gaseous carbon dioxide in an amount as given above, is applied onto an uncoated, a pre-coated or a coated paper substrate, preferably on woodfree basis, using a curtain coater, a blade coater, a roll coater, a spray coater, an air knife, cast coating or specifically by a metering size press. Depending on the paper a gloss to be achieved, the coated paper may be calendered. Possible calendering conditions are as follows: calendering at a speed of in the range of 200-2000 m/min, at a nip load of in the range of 50-500 N/mm and at a temperature above room temperature, preferably above 60° C., even more preferably in the range of 70-95° Celsius, using between 1 and 15 nips.

Furthermore, the present inventions relates to the use of a printing sheet as defined above in a sheet fed or roll offset printing process. In such a process preferably reprinting and/or converting takes place within less than one hour, preferably within less than 0.5 hours, and as outlined further above and there is no or reduced need for offset powder and/or overprint varnish.

Further embodiments of the present invention are outlined in the dependent claims.

SHORT DESCRIPTION OF THE FIGURES

In the accompanying drawing preferred embodiments of the invention are shown in which FIG. 1 is a schematic cut through a coated printing sheet.

DETAILED DESCRIPTION OF THE PREFERRED EMBODIMENTS

Referring to the drawings, which are for the purpose of illustrating the present preferred embodiments of the invention and not for the purpose of limiting the same, FIG. 1 shows a schematic view of a coated printing sheet. The coated printing sheet 4 is coated on both sides with layers, wherein these layers constitute the image receptive coating. In this particular case, a top coating 3 is provided which forms the outermost coating of the coated printing sheet. Beneath this top layer 3 there is provided as second layer 2. In some cases, beneath this second or middle coat layer there is an additional third layer, which may either be a proper coating but which may also be a sizing layer.

Typically a coated printing sheet of this kind has a base weight in the range of 80-400 g/$m^2$, preferably in the range of 100-250 g/$m^2$. The top layer e.g. has a total dried coat weight of in the range of 3 to 25 g/$m^2$, preferably in the range of 4 to 15 g/$m^2$, and most preferably of about 6 to 12 g/$m^2$. The second layer may have a total dried coat weight in the same range or less. An image receptive coating may be provided on one side only, or, as displayed in FIG. 1, on both sides.

The main target of this document is to provide a matte (but also medium and high gloss) coated printing sheet for quick physical ink setting and quick chemical ink drying performance, preferably ink-scuff-free and suited for powder-less printing and ideal fast converting (e.g. no blocking or markings at folding and cutting) applications for sheet-fed offset or roll-offset papers in combination with standard inks, with appealing attractive printed image.

As concerns analytical tests and methods, of which results are mentioned in this experimental section, like short time ink setting, multi-colour ink setting, chemical ink drying, ink scuff/dry ink rub, converting tests like cutting and folding etc. reference is specifically made to the documents WO-A-2007/006794 as well as WO-A-2007/006796 in which the same methods also used here are detailed. As concerns the disclosure of these analytical and test methods these documents WO-A-2007/006794 as well as WO-A-2007/006796 are thus included into this specification.

Experiments, First Part:

Table 1 shows the different matte test papers which were prepared. Eight different papers were made using a pilot coater for the application of middle (M) and top (D) coatings with the formulations as given in the Table 1. The coating formulation was adjusted to a solids content of 65-69%. The coatings were, if the middle coating formulation is not specifically given, applied to a standard pre-coated wood free paper, having a middle coat layer identical to the ones as specifically described in the second series of experiments given as M12ref outlined in more detail in the second section (Table 2) below. Experiments designated with ref are reference coatings outside of the invention for comparative purposes. All papers have TAPPI 75° gloss values of in the range of 25-40% and a grammage of approximately 135 g/$m^2$. The middle coating was applied in a grammage of approximately 12 g/$m^2$ and the top coating in a grammage of approximately 12 g/$m^2$.

TABLE 1

Formulations and results of first trial papers, M indicates formulations of middle coat layers, D formulations of top coat layers, wherein same numerals indicate the same experimental papers and wherein if no middle coat is given, the middle coat indicated in Table 2 under M12ref was used.

| Expt. No. | M3 | M4 | D3 | D4 | D5ref | D8 | D9 | D11 |
|---|---|---|---|---|---|---|---|---|
| PIGMENT | | | | | | | | |
| HC 90 | | 85 | 65 | 65 | 30 | 65 | 60 | 47 |
| HC 60 | 85 | | | | | | | |
| SC HG | | | | | 40 | | | |
| HC V70 R240 | 15 | 15 | 10 | 10 | | 10 | 15 | 25 |
| Miragloss 90 | | | 15 | 15 | 15 | 15 | 15 | 20 |
| Syloid | | | 5 | 5 | 10 | 5 | 5 | 3 |
| Mistrobond | | | 5 | 5 | 5 | 5 | 5 | 5 |

TABLE 1-continued

Formulations and results of first trial papers, M indicates formulations of middle coat layers, D formulations of top coat layers, wherein same numerals indicate the same experimental papers and wherein if no middle coat is given, the middle coat indicated in Table 2 under M12ref was used.

| Expt. No. | M3 | M4 | D3 | D4 | D5ref | D8 | D9 | D11 |
|---|---|---|---|---|---|---|---|---|
| BINDER | | | | | | | | |
| Acronal | | | 5 | 5 | 4 | 5 | 5 | 5 |
| Basonal | 8 | 8 | 3.5 | 3.5 | 5.5 | 3.5 | 3.5 | 3.5 |
| Additives | 0.6 | 0.6 | 1.7 | 1.7 | 1.7 | 1.7 | 1.7 | 1.7 |

Constituents:

HC 90: Ground calcium carbonate pigment "HYDROCARB HC 90 GU", as available e.g. from OMYA, CH, has a median particle diameter in the range of 0.7-0.8 micrometer, and the particle size distribution is such that approximately 90% of the particles are smaller than 2 micrometer and approximately 66% of the particles are smaller than 1 micrometer HC 60: Ground calcium carbonate pigment "HYDROCARB HC 60 GU", as available e.g. from OMYA, CH, has a median particle diameter in the range of 1-2 micrometer, and the particle size distribution is such that approximately 60% of the particles are smaller than 2 micrometer and approximately 37% of the particles are smaller than 1 micrometer.

SC HG: Ground calcium carbonate pigment "SETACARB HG GU", as available e.g. from OMYA, CH, has a mean particle diameter in the range of 0.4-0.6 micrometer, and the particle size distribution is such that approximately 98% of the particles are smaller than 2 micrometer and approximately 90% of the particles are smaller than 1 micrometer.

HC V70 R240: A fine particulate ground calcium carbonate with special surface and internal structure modification as a result of treatment with one or more medium to strong $H_3O^+$ providers and eventual additional treatment with gaseous carbon dioxide, is of the so-called roses type with a median size of approximately 2 micrometer and a specific surface area (BET) of approximately 40 $m^2$/g and an average internal pore size of 0.05 micrometer, as available under the trade name Hydrocarb V70 R240 from OMYA (CH).

Miragloss 90: Fine particle kaolin pigment, as available from BASF, DE, with a Sedigraph particle size of 92%<1 micrometer.

Syloid: Amorphous silica gel as available under trade names like Syloid 72 or Syloid 244 or Syloid C803 from Grace Davidson, DE, with a total pore volume in a range of approximately 1.1-2.0 ml/g, an median particle size in micrometer in the range of approximately 3.1-6 micrometer, a surface area (BET) in the range of 300-390 $m^2$/g and an anionic surface charge.

Mistrobond: Surface treated microcrystalline talcum as available under the trade name Mistrobond C or almost equivalent Mistrobond R10C from Talc de Luzenac, FR, with a median particle size of approximately 2.9 micrometer and a particle size distribution such that approximately 95% of the particles are smaller than 11 micrometer, with a surface area (BET) of approximately 11 m2/g. It comprises more than 98% talcum (rest e.g. 0.5% chlorite and 1% dolomite) and has a hardness of 1 Mohs. The surface treatment comprises an organo-functional silane component (so-called coupling agent) comprising a primary amino-alkyl functional group.

- PCC: Fine precipitated non-porous calcium carbonate, preferably of needle-like particulate structure, with a steep particle size distribution (Sedigraph 5100), namely such that approximately 85-95% are smaller than 1 micrometer, approximately 65-75% are smaller than 0.5 micrometer, and approximately 25-35% are smaller than 0.2 micrometer. It has a median particle size in the range of 0.2-0.5 micrometer. It is as presently available from e.g. Specialty Minerals Inc., USA under the name e.g. Opacarb A40.
- Acronal: Binder as aqueous dispersion of a copolymer on the basis of styrene and acrylic esters, as available from BASF, DE.
- Basonal Binder according multi-monomer concept based on the monomers acrylonitrile, butadiene, butyl acrylate and styrene, as available from BASF, DE.
- Additives: Several additives are added as needed, in the specific case polyvinylalcohol (PVAL), dispersion aids, brighteners, thickeners, antifoaming products etc. as well known to the person skilled in the art.

Comparison of e.g. the ink setting properties of the two experiments 3 and 4, where the top coating (D3 and D4) remains unchanged, shows that these ink setting properties can be improved if in the middle coating a relatively finer calcium carbonate pigment (HC 90 instead of HC60) is used, as experiment 4 shows significantly faster short time and multi colour ink setting properties compared to experiment 3.

Comparison of ink setting properties between experiment 4 and experiment 5 (reference) indicates that the simultaneous presence of the specific pigment HC V70 R240 in the middle coating as well as in the top coating even allows for improved properties like significantly faster short time and multi colour ink setting performance compared with the twice as much silica gel containing reference.

Comparison of ink setting properties between reference experiment 5 and experiment 8, both having comparable short time as well as multi colour ink setting values, clearly documents that indeed HC V70 R240, as present in top coating, may replace silica gel in the pigment part of top coating effectively. Further comparison of experiment 5 with experiments 9 and 11, which even showed significantly improved short time and multi colour ink setting properties compared to reference, indicates that for the proposed matte papers HC V70 R240 in the top coating has very beneficial properties for short time and multi colour ink setting performance.

Experiments, Second Part:

Table 2 shows the further test papers which were prepared. Five different matte papers were made using a pilot coater for the application of middle (M) and top (D) coatings with the formulations as given in the Table 2. The coating formulation was adjusted to a solids content of 65-68%. The coatings were applied to a standard pre-coated wood free paper. Experiments designated with ref are reference coatings outside of the invention for comparative purposes. All papers have TAPPI 75° gloss values of in the range of 20-30% and a grammage of approximately 135 g/m$^2$. The middle coating was applied in a grammage of approximately 12 g/m$^2$ and the top coating in a grammage of approximately 12 g/m$^2$.

TABLE 2

Formulations and results of second trial papers, M indicates formulations of middle coating layers, D formulations of top coating layers, wherein same numerals indicate the same experimental papers.

| Expt. No. | M12ref | M14 | M15 | M18 | M19 | D12ref | D14 | D15 | D18 | D19 |
|---|---|---|---|---|---|---|---|---|---|---|
| PIGMENT | | | | | | | | | | |
| HC 90 | 75 | 85 | 85 | 85 | 75 | 70 | 24.5 | 18 | 35 | 35 |
| HC 60 | 25 | | | | 25 | | 25 | | 28 | 28 |
| PCC | | | | | | | | 50 | | |
| HC V70 R240 | | 15 | 15 | 15 | | | 25 | 25 | 10 | 10 |
| Miragloss 90 | | | | | | 15 | 15 | | 15 | 15 |
| Syloid | | | | | | 10 | 3.5 | | 5 | 5 |
| Mistrobond | | | | | | 5 | 7 | 7 | 7 | 7 |
| BINDER | | | | | | | | | | |
| Acronal | | | | | | 4 | 4 | 4 | 4 | 4 |
| Basonal | 6.5 | 6.5 | 6.5 | 6.5 | 6.5 | 5.5 | 5 | 5 | 5 | 5 |
| Additives | 3.3 | 3.3 | 3.3 | 3.3 | 3.3 | 0.75 | 0.75 | 0.75 | 0.75 | 0.75 |

Comparison of the concept with five parts of silica in top coating based on 10 parts HC V70 R240 in both middle and top coating (experiment 18) with the reference experiment 12 generally shows short time and multi colour ink setting and ink scuff to be on an almost comparable fast level. It could therefore be shown that indeed HC V70 R240 effectively allows to partially replacing incorporated silica pigment in a top coating, preferably not only in the top coating, but also incorporating HC V70 R240 in the middle coating.

Indeed comparison of experiments 18 and 19, showing that experiment 19 without HC V70 R240 in the middle coating clearly is inferior to experiment 18, indicates that the presence of HC V70 R240 in the middle coating is important to contribute to overall fast short time and multi colour ink setting properties of endpaper.

The concept based on still further replacement of silica (experiment 14, only very low silica content in the pigment part) shows, when comparing the ink setting properties with the reference experiment 12, almost comparable fast short time and multicolour ink setting properties.

The completely silica free concept (experiment 15) including in addition a special, preferably needle-like precipitated calcium carbonate (PCC) providing the ideal matrix for HC V70 R240 shows in comparison with the reference experiment 12 increased multicolour ink setting values and comparable short time ink setting. Ink scuff in both experiments 12 and 15, also having incorporated 5-7 parts surface treated Mistrobond R10C in top coating, was attractively low.

In a commercial printing and converting test of the papers from Table 2 it was demonstrated that especially paper M15/D15, but also other papers from Table 2, compared to referent paper M12/D12, show nearly to fully equivalent properties in the field of general printability properties (e.g. appealing printed image, good surface, good solids and screens evenness, low back-trap mottle and two-colour mottle), low ink scuffing (due to presence of surface treated talcum), excellent convertibility (e.g. no markings during blocking test and folding test), possibility for powder-less printing and up to nearly comparable in fast short time and multi colour ink setting behaviour and fast chemical ink drying behaviour according Fogra test.

Experiments, Third Part:

The above described coating formulations led to papers with gloss values in the above defined range for matt papers, so they have TAPPI 75° gloss values of in the range of 20-30%. In this further experimental section the coatings are adapted for higher gloss, i.e. to have TAPPI 75° gloss values of in the medium gloss or even high gloss as defined in the introductory portion of the text. Correspondingly therefore, in Table 3 three further coating formulations for the middle (M) and the top coat layer (D) are given. Calendering using 7-11 nips at a line pressure of 50-200 N/mm took place at a temperature from 50-90° C.

TABLE 3

Formulations and results of third, glossy grade trial papers, M indicates formulations of middle coat layers, D formulations of top coat layers, wherein same numerals indicate the same experimental papers.

| Expt. No. | M20 | M21 | M22 | D20 | D21 | D22 |
|---|---|---|---|---|---|---|
| PIGMENT | | | | | | |
| HC 90 | 85 | 85 | 85 | | | |
| Plastic pigment | | | | | 20 | |
| HC 95 | | | | 65 | 45 | |
| PCC | | | | 20 | 20 | 85 |
| HC V70 R240 | 15 | 15 | 15 | 20 | 20 | 20 |
| Miragloss 90 | | | | 15 | 15 | 15 |
| BINDER | | | | | | |
| Acronal | | | | 5 | 5 | 5 |
| Basonal | 8 | 8 | 8 | 3.5 | 3.5 | 3.5 |
| Additives | 0.6 | 0.6 | 0.6 | 1.7 | 1.7 | 1.7 |

Further Constituents for Third Series:

HC 95: Ground calcium carbonate pigment "HYDROCARB HC 95 GU", as available e.g. from OMYA, CH, has a median particle diameter in the range of approximately 0.4 micrometer, and the particle size distribution is such that approximately 95% of the particles are smaller than 2 micrometer and approximately 78% of the particles are smaller than 1 micrometer.

Plastic pigment: The pigment Ropaque BC-643 as available from Rohm and Haas, DE was used. This is a styrene acrylic polymeric pigment with a 0.6 micrometer particle size and a 43% void volume. As an alternative DPP 3710 can be used, which is available from The Dow Chemical Company. It is a very fine solid particulate polymer (modified polystyrene latex), which is available as a 48% emulsion in water at a pH of 5.5 and a Brookfield viscosity (spindle 2) of <100 mPas. The median particle size is 0.14 micrometer.

The papers given in Table 3 have higher gloss values, namely 20 has a Tappi 75° gloss value in the range of 75%, 21 has at last value in the range of 85% and 22 has a gloss value in the range of 70%. In as far as the other properties like ink setting, convertibility, etc as given above in the context of sections 1 and 2 are concerned, these essentially remaining as attractive as in the previous sections. So as one can see Tappi 75° gloss off the final paper can be adapted by including a higher proportion of fine pigments and/or plastic pigments.

Experiments, Fourth Part:

In this further fourth experimental section the coatings are further adapted for improved printing properties. Correspondingly therefore, in Table 4 one further coating formulation for the middle (M36, used for both top coat layers as a middle layer) and two further for the top coat layer (D40, D41) are given. Calendering using 7-11 nips at a line pressure of 50-200 N/mm took place at a temperature from 50-90° C. The papers were 135 g/m$^2$, coated on both sides.

TABLE 4

Formulations and results of fourth trial papers, matte grade, M indicates formulations of middle coat layers, D formulations of top coat layers, wherein same numerals indicate the same experimental papers.

| Expt. No. | M36 | D40 | D41 |
|---|---|---|---|
| PIGMENT | | | |
| PCC Precarb 720 | | 20 | 20 |
| HC 90 | 85 | 40 | 38 |
| SC HG | | 5 | 5 |
| HC V70 R240 | 15 | 25 | 25 |
| Syloid | | | 2 |
| Miragloss 90 | | 10 | 10 |
| BINDER | | | |
| Acronal | | 8.5 | 8.5 |
| Basonal | 6.5 | 1.0 | 1.0 |
| Additives | 0.3 | 1.0 | 1.0 |

Further Constituents for Fourth Series:

PCC Precarb 720: Precipitated calcium carbonate pigment "PRECARB 720", as available e.g. from Schafer Kalk GmbH & Co KG, DE, has a median particle diameter in the range of approximately 0.5 micrometer, and the particle size distribution is such that approximately 84% of the particles are smaller than 1.54 micrometer and approximately 50% of the particles are smaller than 0.49 micrometer, and approximately 16% of the particles are smaller than 0.31 micrometer. In other words about 75% are smaller than 1 micro metre.

The matt papers given in Table 4 have gloss values in the range of 15-25% Tappi 75° gloss. The printing gloss is in the range of 50-60% Tappi 75° gloss, and both papers show fast set-off as is collected in table 5. The papers show no picking, ink rub resistance is high (wet ink rub, white gas tests and ink rub resistance) there is no blocking and multicolour ink setting is also fast (see table 5).

TABLE 5

Printing properties of the papers according to the fourth section. Printing tests

| Paper | | D40 | D41 |
|---|---|---|---|
| Set-Off - (seconds) | | | |
| Set-off 15 sec. | top | 0.75 | 0.57 |
| | bottom | 0.68 | 0.65 |
| Set-off 30 sec. | top | 0.40 | 0.30 |
| | bottom | 0.37 | 0.32 |
| Set-off 60 sec. | top | 0.11 | 0.07 |
| | bottom | 0.13 | 0.10 |

TABLE 5-continued

| Printing properties of the papers according to the fourth section. Printing tests | | | | |
|---|---|---|---|---|
| Paper | | | D40 | D41 |
| Set-off 120 sec. | top | | 0.02 | 0.02 |
| | bottom | | 0.03 | 0.03 |
| Multi Color Ink Setting (min.) | | | | |
| 2 min | top | | 0.45 | 0.40 |
| | wire | | 0.45 | 0.45 |
| 6 min | top | | 0.04 | 0.04 |
| | wire | | 0.04 | 0.04 |
| 10 min | top | | 0.01 | 0.01 |
| | wire | | 0.02 | 0.02 |
| Printing gloss | top | % | 61.5 | 58.4 |
| Tappi 75° | bottom | % | 66.6 | 57.8 |

Both papers have the same middle layer M36 according to table 4.

In as far as the other properties like convertibility, etc as given above in the context of sections 1 and 2 are concerned, these essentially remaining as attractive as in the previous sections. The papers could be printed without the use of infrared drying or printing powder. It is noted that the coating formulation (D41) may comprise only small silica gel (Syloid) which indeed contributes to fast drying properties, however also without any silica gel (D40) good printing properties can be achieved at more attractive cost.

The invention claimed is:

1. A coated paper for offset printing comprising at least on one side a top coating layer, said top coating layer comprising a pigment part, the 100 parts in dry weight thereof comprising 5-40 parts in dry weight of a fine particulate ground calcium carbonate with surface and internal structure modification as a result of treatment with one or more medium to strong $H_3O^+$ ion providers and optionally with additional treatment of gaseous carbon dioxide, 30-80 parts in dry weight of a further fine particulate pigment selected from the group consisting of: fine particulate carbonate, kaoline, talcum, gypsum, titanium dioxide, barium sulphate, alumina tri-hydroxide, satin white, plastic pigment, or a mixture thereof, a binder part of 2-20 parts in dry weight of binder, and additives in the range of 0-8 parts in dry weight.

2. The coated paper according to claim 1, wherein the fine particulate ground calcium carbonate with surface and internal structure modification and optionally with additional treatment of gaseous carbon dioxide has a nano-sized surface and internal pore structure with internal or surface pores with average pore sizes in the range of 5-100 nm.

3. The coated paper according to claim 1, wherein the fine particulate ground calcium carbonate with surface and internal structure modification and optionally with additional treatment of gaseous carbon dioxide is comprised in the pigment part in the range of 10-30 parts in dry weight.

4. The coated paper according to claim 1, wherein the fine particulate ground calcium carbonate with surface and internal structure modification and optionally with additional treatment of gaseous carbon dioxide has a median particle size in the range of 1.5-2.5 μm.

5. The coated paper according to claim 1, wherein the fine particulate ground calcium carbonate with surface and internal structure modification and optionally with additional treatment of gaseous carbon dioxide has a particle size distribution such that 73-83% of the particles are smaller than 2 μm, and that 35-44% are smaller than 1 μm.

6. The coated paper according to claim 1, wherein the fine particulate ground calcium carbonate with surface and internal structure modification is of the roses type.

7. The coated paper according to claim 1, wherein the pigment part comprises less than 15 parts of an amorphous silica gel or precipitated silica.

8. The coated paper according to claim 1, wherein the further fine particulate pigment is without surface and internal structure modifications.

9. The coated paper according to claim 1, wherein the pigment part comprises one or a mixture of further fine particulate precipitated calcium carbonate pigments in a proportion of 10-40 parts in dry weight, wherein this further fine particulate precipitated calcium carbonate pigment has a particle size distribution such that 70-95% of the particles are smaller than 1.6 micrometer, that 60-80% of the particles are smaller than 1.0 micrometer, and that 10-25% of the particles are smaller than 0.4 micrometer.

10. The coated paper according to claim 9, wherein its pigment part consists of 10-30 parts in dry weight of the one or a mixture of fine particulate ground calcium carbonates with surface and internal structure modification and optionally with additional treatment of gaseous carbon dioxide, 10-30 parts in dry weight of the one or the mixture of the fine particulate precipitated calcium carbonate, 30-50 parts in dry weight of one or a mixture of further fine particulate ground calcium carbonate pigment, as well as 0-15 parts in dry weight of one or a mixture of a talcum pigment.

11. The coated paper according to claim 1, wherein the pigment part comprises a further fine particulate calcium carbonate pigment in a proportion of 30-80 parts in dry weight.

12. The coated paper according to claim 1, wherein the further fine particulate pigment essentially has no internal pores within the pigment particles.

13. The coated paper according to claim 7, wherein the further fine particulate pigment has median particle size in the range of 0.2-0.5 micrometer, and is a precipitated calcium carbonate, plastic and/or kaoline pigment.

14. The coated paper according to claim 1, wherein its pigment part consists of 20-30 parts in dry weight of the fine particulate ground calcium carbonate with surface and internal structure modification and optionally with additional treatment of gaseous carbon dioxide, 40-60 parts in dry weight of the fine particulate precipitated calcium carbonate, 10-30 part in dry weight of a further different fine particulate calcium carbonate pigment, with a particle size distribution such that 90% of the particles are smaller than 2 micrometer, as well as 3-10 parts in dry weight of a talcum pigment.

15. The coated paper according to claim 1, wherein beneath said top coating layer there is a middle coating layer, wherein this middle coating layer comprises a pigment part, the 100 parts in dry weight thereof comprising in the range of 5-40 parts in dry weight of a fine particulate ground calcium carbonate with surface and internal structure modification and optionally with additional treatment of gaseous carbon dioxide as defined in any of the preceding claims, a binder part and optionally additives.

16. Use of a paper according to claim 1 in an offset printing process, with reduced use or without the use of offset powder and/or without irradiative drying after printing and/or with reduced use or without use of overprint varnish.

17. The coated paper according to claim 1, wherein the fine particulate ground calcium carbonate with surface and internal structure modification and optionally with additional treatment of gaseous carbon dioxide has a nano-sized surface and internal pore structure with internal or surface pores with average pore sizes in the range of 30-70 nm, most with a narrow pore size distribution.

18. The coated paper according to claim 1, wherein the fine particulate ground calcium carbonate with surface and internal structure modification has a median pore size in the range of 0.04-0.06 μm and with narrow pore size distribution.

19. The coated paper according to claim 1, wherein the fine particulate ground calcium carbonate with surface and internal structure modification has a surface area in the range of 30-80 $m^2/g$.

20. The coated paper according to claim 1, wherein the pigment part comprises less than or equal to 5 parts in dry weight of an amorphous silica gel or precipitated silica.

21. The coated paper according to claim 1, wherein the pigment part comprises a further fine particulate pigment selected from the group of carbonate, kaoline, talcum, plastic pigment or a mixture thereof, wherein the talcum pigment makes up 3-10 parts in dry weight of the pigment part.

22. The coated paper according to claim 1, wherein the pigment part comprises one or a mixture of further fine particulate precipitated calcium carbonate pigments in a proportion of 15-30 parts in dry weight, wherein this further fine particulate precipitated calcium carbonate pigment has a particle size distribution such that 70-95% of the particles are smaller than 1.6 micrometer, that 60-80% of the particles are smaller than 1.0 micrometer, and that 10-25% of the particles are smaller than 0.4 micrometer, wherein this further fine particulate has a surface area in the range of 30-50 $m^2/g$.

23. The coated paper according to claim 9, wherein its pigment part consists of 15-25 parts in dry weight of the one or a mixture of fine particulate ground calcium carbonates with surface and internal structure modification and optionally with additional treatment of gaseous carbon dioxide, 15-25 parts in dry weight of the one or the mixture of the fine particulate precipitated calcium carbonate, 40-50 parts in dry weight of one or a mixture of further fine particulate ground calcium carbonate pigment, with a particle size distribution such that at least 90% of the particles are smaller than 2 micrometer, as well as 3-12 parts in dry weight of one or a mixture of a talcum pigment, of a talcum which is surface treated and/or impregnated with aminosilane coupling agents.

24. The coated paper according to claim 1, wherein the pigment part comprises a further fine particulate, precipitated calcium carbonate, pigment in a proportion of 40-60 parts in dry weight, wherein this further fine particulate pigment has a particle size distribution such that 85-95% of the particles are smaller than 1 micrometer, that 65-75% of the particles are smaller than 0.5 micrometer, and that 35-45% of the particles are smaller than 0.2 micrometer, wherein the precipitated calcium carbonate is such that it provides interconnected intra-particulate pores or voids in the total pigment matrix with average pores or voids diameter of approximately 0.1-1 μm.

25. The coated paper according to claim 1, wherein the pigment part comprises a further fine particulate carbonate and/or kaoline and/or talcum and/or gypsum and/or titanium dioxide and/or barium sulphate and/or alumina tri-hydroxide and or satin white and/or plastic pigment or a mixture thereof, and wherein the further fine particulate pigment essentially has no internal pores within the pigment particles, and wherein the further fine particulate pigment is of aragonite, of needle type morphology, and wherein the further fine particulate pigment has a surface area (BET) in the range of 8-20 $m^2/g$.

26. The coated paper according to claim 1, wherein beneath said top coating layer there is a middle coating layer, wherein this middle coating layer comprises a pigment part, the 100 parts in dry weight thereof comprising in the range of 10-20 parts in dry weight of a fine particulate ground calcium carbonate with surface and internal structure modification and optionally with additional treatment of gaseous carbon dioxide as defined in any of the preceding claims, a binder part and optionally additives, wherein the remainder of the pigment part of the middle coating layer comprises or consists of at least one further and different fine particulate pigment selected from the group of: calcium carbonate, kaoline, talcum, gypsum, alumina tri-hydroxide, barium sulphate, satin white, titanium dioxide, plastic pigment and mixtures thereof.

* * * * *